United States Patent [19]

Kuge et al.

[11] 4,370,049

[45] Jan. 25, 1983

[54] IMAGE DEVELOPING DEVICE

[75] Inventors: Tsukasa Kuge; Koichi Tanigawa; Hiroyuki Adachi, all of Tokyo, Japan

[73] Assignee: Canon Kabushiki Kaisha, Tokyo, Japan

[21] Appl. No.: 240,837

[22] Filed: Mar. 5, 1981

[51] Int. Cl.³ .............................................. G03G 15/00
[52] U.S. Cl. ................................... 355/3 DD; 355/14 D; 118/651; 118/657; 430/122
[58] Field of Search ............. 355/3 DD, 14 D, 3 CH, 355/14 CH; 118/651, 621, 625, 647, 648, 657, 658; 427/18

[56] References Cited

U.S. PATENT DOCUMENTS

| | | | |
|---|---|---|---|
| T959,003 | 6/1977 | Hull | 355/3 DD X |
| 3,908,037 | 9/1975 | Bickmore | 355/3 DD X |
| 4,226,526 | 10/1980 | Hashimoto | 355/3 DD |
| 4,230,070 | 10/1980 | Murasaki et al. | 118/658 |
| 4,261,290 | 4/1981 | Yamashita et al. | 118/658 |
| 4,266,503 | 5/1981 | Uehara et al. | 118/657 |

*Primary Examiner*—A. C. Prescott
*Attorney, Agent, or Firm*—Fitzpatrick, Cella, Harper & Scinto

[57] ABSTRACT

An image developing device capable of forming a magnetic brush of one-component developer on a developer-feeding magnetic brush roller, and bringing said magnetic brush into contact with a developing roller to form a thin layer of the one-component developer thereon. In the mutually facing area between the rollers the magnetic force of the developing roller for transporting the developer is selected smaller than that of the magnetic brush roller for transporting the developer. The magnetic brush roller and the developing roller are rotated in a same direction so that they are moved mutually oppositely at the mutually facing area thereof.

15 Claims, 11 Drawing Figures

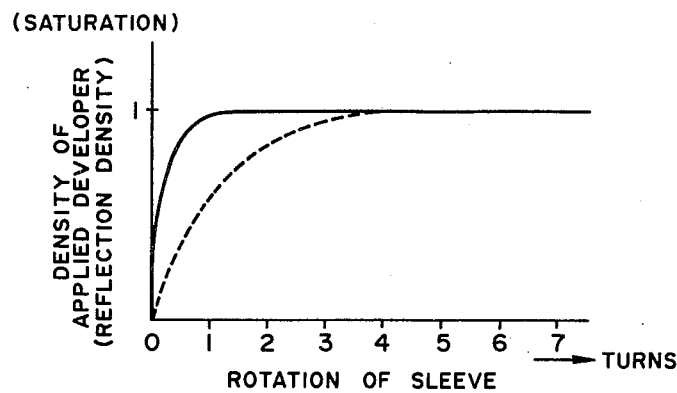
FIG. 8
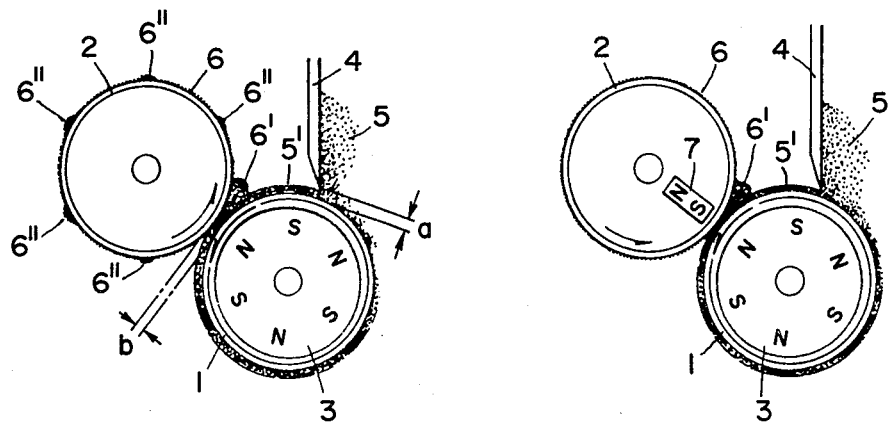
FIG. 9
FIG. 10    FIG. 11

IMAGE DEVELOPING DEVICE

BACKGROUND OF THE INVENTION

1. Field of the Invention

The present invention relates to an improvement on the so-called jumping developing device in which a thin layer of one-component magnetic developer formed on a developer bearing member is brought to the proximity of a surface bearing an electrostatic latent image to be developed whereby the developer is caused to jump to said surface from said thin developer layer by means of the electric force of said latent image to render the same visible.

2. Description of the Prior Art

There are already known various developing methods utilizing one-component developer. Among these particularly noteworthy is so-called toner transition development, in which one-component developer applied as a thin uniform layer on a developer bearing means is brought into facing relationship to an electrostatic latent image bearing surface with a small clearance therebetween whereby the developer is caused to jump from said developer bearing means to the image bearing surface by the electrostatic attractive force to perform image development, as disclosed in Japanese Patent Publication Sho41-9475 and in U.S. Pat. No. 2,839,400. Such developing method assures satisfactory development completely free from background fog as the developer is not attracted nor brought into contact with the non-image area having no image potential. Besides the absence of carrier particles eliminates the troubles arising from the change in mixing ratio thereof in the developer or from the time-dependent deterioration of the carrier particles.

Furthermore, the present applicant proposed novel developing methods as disclosed in the U.S. Patent Applications Ser. Nos. 938,101 now abandoned and 938,494 now abandoned and Ser. Nos. 58,434 now abandoned and 58,435 now U.S. Pat. No. 4,292,387, issued Sept. 29, 1981.

The former method is featured in positioning one-component magnetic developer, a developer bearing non-magnetic means and a magnetic field generating means in this order to form a thin uniform layer of said developer on said developer bearing means under the effect of the magnetic field generated by said magnetic-field generating means, and maintaining said thin developer layer in facing relation to an electrostatic latent image bearing surface with a small clearance therebetween thereby extending the developer corresponding to the image area by the electrostatic attractive force of said latent image to perform the image development. This method also is capable of providing a completely fog-free visible image as the development is carried out without contact of the developer with the non-image area.

The latter method is featured in positioning one-component magnetic developer, a developer bearing non-magnetic means and a magnetic field generating means in this order to form a thin uniform layer of said developer on said developer bearing means under the effect of the magnetic field generated by said magnetic-field generating means, and maintaining said thin developer layer in facing relation to an electrostatic latent image bearing surface with a small clearance therebetween, wherein the image development is effected by applying an AC developing bias voltage across said clearance between the image bearing surface and developer bearing means and changing said clearance in time. In this method the developer reaches also the non-image area in the initial stage to effect the development of halftone image but reaches only the image area in the later stage, thereby providing the image without background fog and with improved halftone reproducibility in comparison with the above-explained method.

As explained in the foregoing, the developing methods in which a thin layer of one-component developer is faced to the latent image bearing surface are far superior to other conventionally known methods in terms of the developing performance, image reproducibility, service life of the developer, etc.

Conventionally such thin developer layer has ordinarily been formed by employing a non-magnetic sleeve as the developer bearing member and by applying a thin layer of one-component magnetic developer thereon by means of a blade of a magnetic material and a strong magnetic field generated by magnetic poles positioned inside said sleeve. As an improvement to the above-mentioned method, the present applicant already proposed a developing device in which a magnetic brush of magnetic developer is formed on a magnetic brush roller or a developer-feeding first bearing member and is brought into contact with a developing roller or an image-developing second bearing member to form a thin developer layer on said developing roller.

FIG. 1 schematically shows such developing device, comprising a magnetic brush sleeve roller 1 constituting the first developer bearing member (hereinafter referred to as magnetic brush sleeve), a developing sleeve roller 2 constituting the second developer bearing member (hereinafter referred to as developing sleeve), a fixed magnet 3 positioned inside said magnetic brush sleeve 1, a magnetic brush defining blade 4, one-component insulating magnetic developer 5, a thin developer layer 6 applied on said developing sleeve 2, a fixed magnet 7 positioned inside said developing sleeve 2, and a developer hopper 8. Along with the rotation of said magnetic brush sleeve 1, a toner layer 5' supported thereon collides with the surface of the developing sleeve 2 to provide the insulating developer with frictional charge, and a thin developer layer 6 is formed on said developing sleeve 2 by means of mirror force and the like. The magnetic pole 7 positioned inside the developing sleeve is provided to achieve an effect of increasing the probability of contact between the developer in the magnetic brush 5' on the magnetic brush sleeve 1 and the surface of the developing sleeve 2 thereby increasing the applied density of the developer, and an effect of causing uniform sliding contact of the magnetic brush with the developing sleeve 2, as detailedly described in the foregoing application of the present applicant.

The thin developer layer 6 thus formed on the developing sleeve 2 is brought by the rotation thereof to the proximity of a photosensitive drum constituting the surface to be developed, thereby effecting so-called jumping development. Ordinary jumping development is featured by a relatively narrow clearance $a$, in the order of 300$\mu$, between the photosensitive drum 9 and the developing roller 2. Although the conventional developing device for forming a thin developer layer on the developing sleeve by means of a magnetic blade and a magnetic field has necessitated a very narrow clearance, in the order of 200 to 500$\mu$, between the magnetic blade and the developing sleeve in consideration of the above-mentioned clearance of ca. 300μ between the photosensitive drum 9 and the developing sleeve 2, the developing device shown in FIG. 1 allows to significantly expand the minimum clearance β between the developing sleeve 2 and the magnetic brush sleeve 1 approximately to a range of 500 to 2000μ, thereby reducing the load applied to the developer in the developer applying area and thus resolving the developer aggregation or other troubles inevitable in the conventional developing device.

In FIG. 1 there is also shown an AC bias voltage source 10 disclosed in the aforementioned U.S. Patent Applications Ser. Nos. 58,434 and 58,435.

Although the device shown in FIG. 1 is thus improved in comparison with the conventional devices, it still contains certain drawbacks to be resolved.

Firstly, the developer layer formation on the developing sleeve 2 substantially depending upon the triboelectric charging of the developer tends to result in a somewhat deficient density thereof, eventually leading to an unstable image quality.

Secondly, foreign matter eventually trapped between the magnetic brush defining blade 4 and the magnetic brush sleeve 1 generates a lacking portion in the developer layer 5', which correspondingly results in a low-density imperfection in the form of a white streak, and such imperfection directly results in, in the jumping development, a defect in the developed image.

Thirdly the absence of a doctoring blade or the like directly defining the thickness of developer layer 6 on the developing sleeve 2 tends to result in an unstable thickness, eventually leading to an uneven developer layer occasionally containing an excessively thick portion with respect to the clearance between the photosensitive drum 9 and the developing sleeve 2 or giving rise to a thickness in excess of said clearance thus causing damage to the photosensitive drum 9.

Fourthly, the developer layer on the developing sleeve 2 may not be fully recovered to a sufficient density within one turn after the developer is consumed in the preceding developing process, leading to the formation of a ghost image of the preceding cycle, thus smearing the image quality.

SUMMARY OF THE INVENTION

The object of the present invention is to provide a developing device capable of forming a thin developer layer of a sufficient density on the second developer bearing member.

Another object of the present invention is to provide a developing device in which the thin developer layer 6 formed on the second developer bearing member 2 is not affected by the irregularities in the magnetic brush.

Still another object of the present invention is to provide a developing device not associated with uneven thickness of developer layer nor excessive thickness thereof eventually leading to developer aggregation between the photosensitive drum and the second developer bearing member.

Still another object of the present invention is to provide a developing device not associated with the development ghost phenomenon.

The foregoing objects can be achieved according to the present invention by a developing device comprising an image-developing bearing member supporting one-component magnetic developer thereon, means for displacing said image-developing bearing member to transport the layer of said developer to an image-developing position, a developer-feeding bearing member positioned in the proximity of said image-developing bearing member, magnetic-field generating means positioned opposite to said image-developing bearing member across said developer-feeding bearing member, a magnetic pole so positioned in said magnetic-field generating means as to be in facing relation to said image-developing bearing member for forming a magnetic brush on said developer-feeding bearing member, said magnetic brush being brought into contact with said image-developing bearing member to form a thin developer layer thereon, and a magnet so positioned inside said image-developing bearing member as to be in facing relation to said magnetic pole for forming the magnetic brush, wherein the magnetic force of said image-developing bearing member for developer transportation is selected smaller than that of said developer-feeding bearing means in the mutually facing area of said bearing members. Furthermore the foregoing objects can be achieved by rotating the developer-feeding first bearing member and the image-developing second bearing member in the same direction to displace the surfaces thereof in mutually opposite directions in the mutually facing area of said bearing members thereby causing a vigorous agitation of the developer in said mutually facing area, also by so selecting the clearance a between the magnetic brush defining blade and the developer-feeding bearing member and the clearance b between two bearing members as to satisfy a certain relationship, and maintaining a certain relationship between the surface flux densities of said bearing member at the mutually facing area there-between.

The foregoing and still other objects and advantages of the present invention will be made apparent from the following detailed description to be taken in conjunction with the attached drawings.

BRIEF DESCRIPTION OF THE DRAWINGS

FIG. 8 is a chart showing the relation between the number of turns of the developing sleeve and the developer density thereon;

FIG. 9 is a chart showing the state of developer layer as a function of the clearance a between the magnetic brush defining blade and the magnetic brush sleeve and of the clearance b between the magnetic brush sleeve and the developing sleeve;

FIG. 10 is a lateral view showing an inappropriate application state; and

FIG. 11 is a lateral view of a variation.

DETAILED DESCRIPTION OF THE PREFERRED EMBODIMENTS

Figure 1:
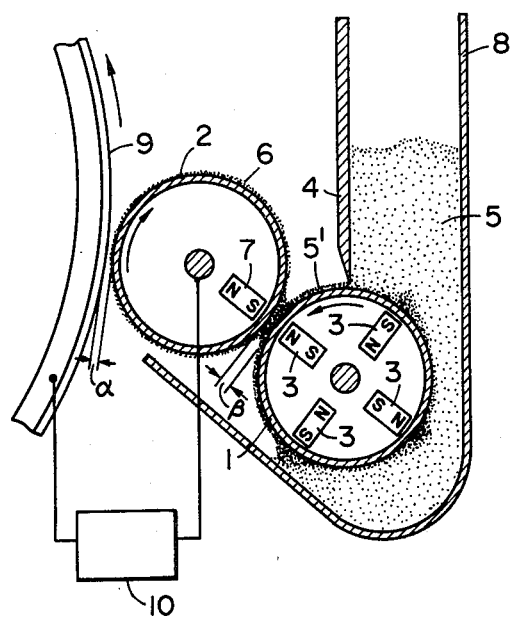
FIG. 1 is a schematic cross-sectional view of a conventional jumping developing device comprising a magnetic brush roller and a developing roller.

The developer present in the magnetic brush 5' receives the magnetic forces generated by the magnetic pole 3 present in the magnetic brush sleeve 1 and by the magnetic pole 7 present in the developing sleeve 2, frictional drag forces resulting from the rotation of said sleeves 1, 2, and electric forces such as mirror force caused by frictional charging generated by the contact between the developer and the sleeve surface or between the developer particles, among which the magnetic forces and frictional drag forces are the major factors governing the movement of the magnetic brush.

Figure 2:
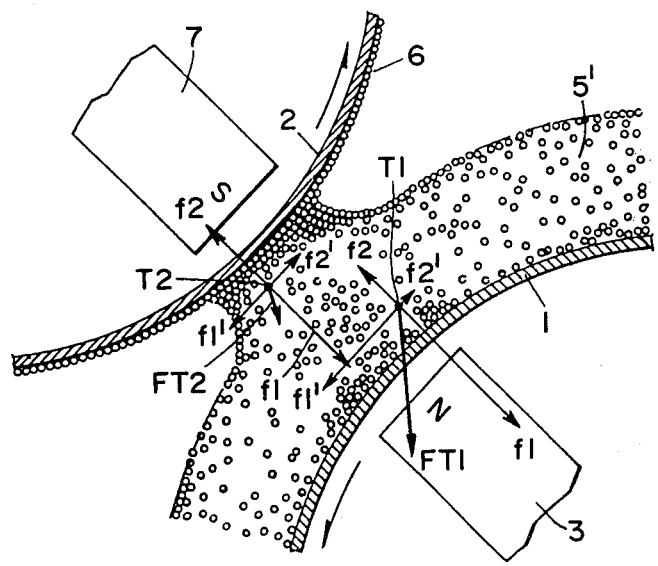
FIG. 2 is a schematic view showing the relation between the magnetic force and the frictional drag force applied to the developer at the application thereof as a thin layer on the developing sleeve.
Figure 3:
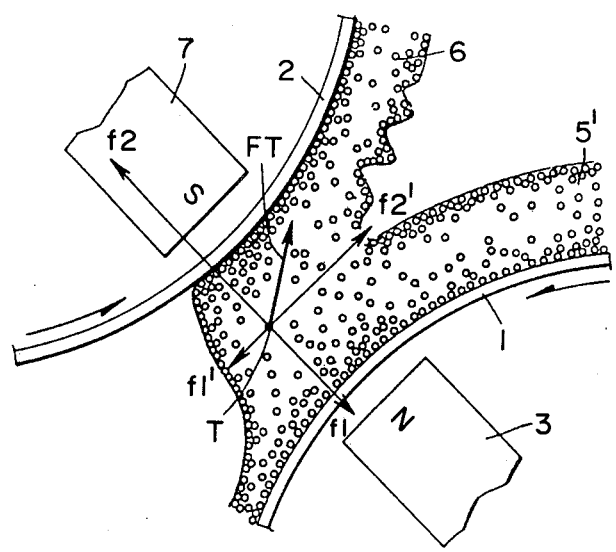
FIG. 3 is a schematic view showing an inappropriate magnetic force relationship incapable of providing a thin developer layer.

FIG. 2 shows the magnetic forces, frictional drag forces and resultant forces applied to the developer particles present in the magnetic brush 5', including an attractive force f1 by the magnetic pole 3 inside the magnetic brush sleeve, an attractive force f2 by the magnetic pole 7 inside the developing sleeve, a frictional drag force f1' caused by the rotation of the magnetic brush sleeve 1 and a frictional drag force f2' caused by the rotation of the developing sleeve 2. T1 indicates a developer particle present in the base portion of the magnetic brush 5', or in the proximity of the magnetic brush sleeve 1, while T2 indicates a developer particle in the end portion of the magnetic brush 5', or in the proximity of the developing sleeve 2, FT1 and FT2 are resultant forces of said magnetic forces f1, f2 and frictional drags f1', f2' applied to said developer particles.

FIG. 2 shows a normal formation of thin developer layer, wherein the developer particle T1 present in the proximity of the magnetic brush sleeve 1 is principally governed by the attractive force f1 by the magnetic pole 3 inside the magnetic brush sleeve 1 and is displaced together with said sleeve 1 while being pressed thereagainst as shown by the resultant force FT1. It is important to note in this state that even the resultant force FT2 applied to the developer particle T2 present in the proximity of the developing sleeve 2 does not have a component to attract said particle T2 toward the developing sleeve 2. Consequently the formation of thin developer layer 6' on the developing sleeve 2 is not achieved by the attractive force of the magnetic pole 7 positioned inside the developing sleeve 2 but basically by the electric forces which are caused by triboelectric charge through contact of the developer T2 with the surface of the developing sleeve 2 and which function to induce the developer deposition onto said sleeve against the magnetic force or frictional drag force.

The instability in developer layer formation in the conventional devices lies in the fact that the force FT on the developer T resulting from the magnetic forces f1, f2 and frictional drag forces f1', f2' is directed to press the developer T towards the developing sleeve 2, thereby causing the transfer of the magnetic brush itself in bulk onto the sleeve 2 to result in a developer layer not suitable for jumping development.

As explained in the foregoing, it is essential, in the developing device comprising the magnetic brush sleeve 1 and the developing sleeve 2, that the developer of the magnetic brush is attracted by and transported with the magnetic brush sleeve in the mutually facing area of said sleeves, except for a small portion of the developer constituting the thin developer layer. Stated differently in said mutually facing area the magnetic force of the developing sleeve 2 for transporting developer should be selected smaller than that of the magnetic brush sleeve 1.

This requirement can be met by selecting, at the surface of the developing sleeve 2 in said mutually facing area, the perpendicular component of the magnetic flux density resulting from the magnetic pole 7 in the developing sleeve smaller than that of the flux density resulting from the magnetic pole 3 in the magnetic brush sleeve.

Figure 4:
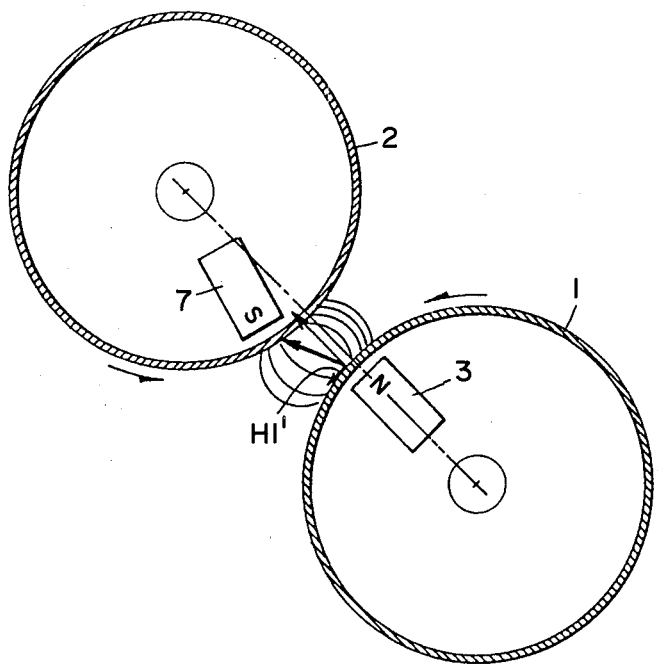
FIG. 4 is a schematic view of another embodiment for stably providing a thin developer layer.

Said requirement can also be met by replacing the magnetic pole 7 in the developing sleeve 2 with a magnetic substance, or simply by removing said magnetic pole. By these methods, the perpendicular component of the magnetic flux density associated with the developing sleeve 2, at the surface thereof in the mutually facing area between both sleeves 1, 2, assuredly becomes smaller than that of the flux density resulting from the magnetic brush sleeve 1. In contrast to the foregoing case in which the magnetic pole 3 in the magnetic brush sleeve 1 and the magnetic pole 7 in the developing sleeve 2 are positioned in mutually facing arrangement to contribute to the developer layer formation, FIG. 4 shows a modified arrangement of the magnetic poles 3, 7 for stabilizing the developer layer formation, wherein other components than the sleeves 1, 2 and the magnetic poles 3, 7 are omitted for the purpose of clarity. The magnetic pole 7 in the developing sleeve 2 is arranged upstream, with respect to the moving direction of the developing sleeve 2, to the position of the magnetic pole 3 in the magnetic brush sleeve, whereby said magnetic pole 3 in the magnetic brush sleeve 1 and the magnetic pole 7 in the developing sleeve from a magnetic field having a component H1' directed oppositely to the rotation of the developing sleeve 2. Consequently a magnetic force is applied to the developer, in the developer applying area or the mutually facing area of both sleeves, oppositely to the moving direction of the developing sleeve 2, thereby further avoiding the overflow of developer onto the developing sleeve 2. In the above-mentioned arrangement the magnetic flux density on the developing sleeve 2 resulting from the magnetic pole 7 may exceed, in its maximum value, the magnetic flux density on the magnetic brush sleeve 1, as long as the flux density on the developing sleeve 2 is smaller than that on the magnetic brush sleeve 1 in the mutually facing area of both sleeves.

Figure 5:
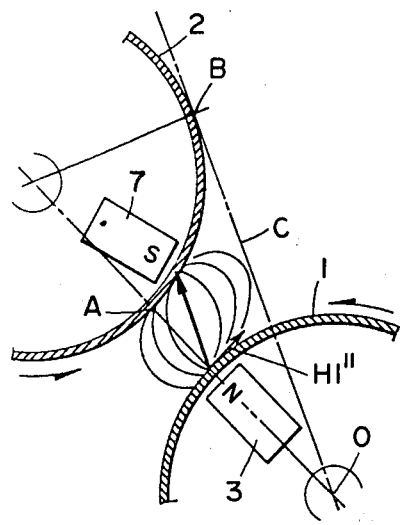
FIG. 5 is a schematic view showing an example of inappropriate magnetic pole arrangement.

FIG. 5 shows a contrary case in which the magnetic pole 7 in the developing sleeve 2 is positioned downstream, with respect to the moving direction of said sleeve 2, to the mutually facing area of the sleeves 1, 2, wherein the magnetic poles 3, 7 forms a magnetic field having a component H1" directed same as the rotation of said developing sleeve 2. Consequently in this case a part of the magnetic brush is transferred onto the developing sleeve 2 to form uncontinuous blocks thereon, leading to developer aggregation between the photosensitive drum and the developing sleeve and eventually causing damage to the photosensitive drum. Also the magnetic pole 7, if positioned within an area between a point A on the developing sleeve 2 corresponding to the mutually facing area of said sleeves and a contact point B, at the downstream side with respect to the rotating direction of the developing sleeve 2, to a tangential line C passing through the center O of the magnetic brush sleeve 1, attracts the developer eventually scattered from the magnetic brush toward the developing sleeve 2, thereby causing random unevenness in the thin developer layer 6.

From the foregoing it can be concluded that the magnetic pole should be so positioned in the developing sleeve as not to form a magnetic maximum, in the area from the point A to B, affecting the movement of the magnetic brush or of the scattered developer.

As explained in the foregoing the present invention allows to realize a developing device capable of constantly and stably forming a thin developer layer suitable for jumping development on the developing sleeve.

EXAMPLE 1

The developing device shown in FIGS. 1 and 2 was prepared with a clearance $\beta$ of 1.00 mm between the magnetic brush sleeve 1 and the developing sleeve 2, with a perpendicular component equal to 400 gauss of the magnetic flux density on the surface of the developing sleeve 2 caused by the magnetic pole 7 therein and with a perpendicular component equal to 700 gauss of the magnetic flux density transmitted through the magnetic brush from the magnetic pole 3 in the magnetic brush sleeve 1 to obtain, on the developing sleeve 2, a satisfactory thin layer of one-component magnetic developer having a reflective density of 1.60.

EXAMPLE 2

A developing device shown in FIG. 4 was prepared by positioning a magnetic pole 7, having a flux density of 1000 gauss on the developing sleeve, at a position 10° upstream, with respect to the rotating direction thereof, from a magnetic pole 3 having a flux density of 800 on the magnetic brush sleeve 1, and forming a clearance $\beta$ of 1.00 mm between said sleeves 1, 2 to obtain a stable and satisfactory thin layer of one-component magnetic developer having a reflective density of 1.80.

EXAMPLE 3

A developing device shown in FIG. 1 was prepared with an aluminum doctoring blade 4 spaced by 0.8 mm from a stainless steel magnetic brush sleeve 1 having a surface flux density of 800 gauss which is in turn spaced by 1.5 mm from a stainless steel developing sleeve 2, which was provided with a magnetic pole 7 causing a flux density of 600 gauss on the developer applying area. On the developing sleeve 2 there was obtained a denser thin layer of one-component developer showing a reflective density of 1.8, and the developed image showed a sufficient density as high as 1.6.

Figure 6:
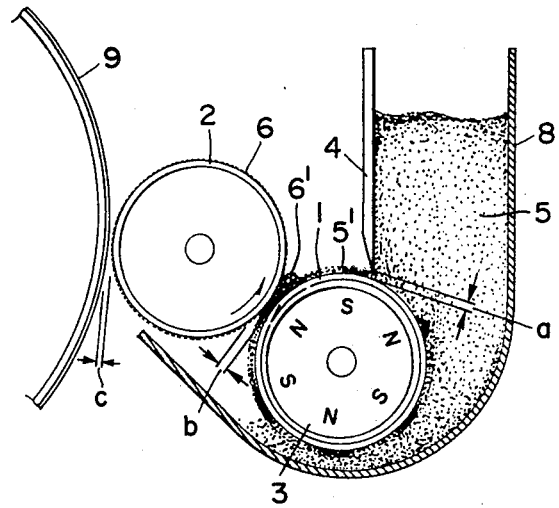
FIG. 6 is a schematic lateral view of an embodiment of the present invention.
Figure 7:
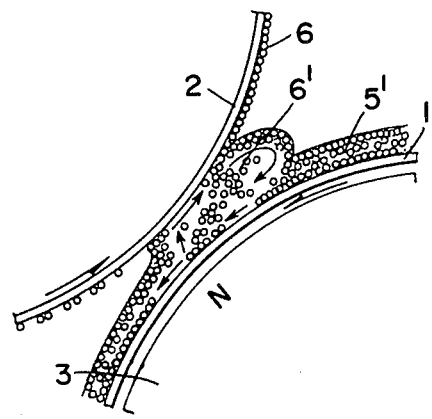
FIG. 7 is a magnified view of the retained developer pool of the device shown in FIG. 6.

FIG. 6 shows an embodiment in which the magnetic brush sleeve 1 and the developing sleeve 2 are both rotated anticlockwise whereby the layer 5' of one-component developer forms a retained pool 6' in the developer applying area between said sleeves 1, 2, said retained pool 6' being shown in magnified scale in FIG. 7.

The developer in the layer 5' is principally displaced in the rotating direction of said sleeve 1 particularly in the vicinity of the surface thereof, but the developer in the end portion of the magnetic brush coming into contact with the developing sleeve 2 is hindered from said displacement by the oppositely moving surface of the developing sleeve 2 to form a retained developer pool 6' rotating clockwise, namely oppositely to said sleeves. Such retained pool 6', of which dimension is variable depending on various factors to be explained later, is specific to a structure in which the magnetic brush sleeve 1 and the developing sleeve 2 are rotated in a same direction, and stabilization of the developer application on the developing sleeve 2 can be achieved as explained in the following by so selecting the rotating direction of the developing sleeve 2 as to form a retained developer pool 6' between said sleeves 1, 2 or, namely, as to displace the developing sleeve 2 in a direction opposite to the moving direction of the magnetic brush in the mutually facing area of said sleeves 1, 2.

Firstly, in such arrangement, it is rendered possible to obtain a sufficiently high density in the developer layer even when the revolution of the magnetic brush sleeve 1 is equal to or less than that of the developing sleeve 2, since the developer in the pool 6' shows random movement as indicated by the arrows in FIG. 7 to drastically increase the agitation therein in comparison with the case in which the surface of the developing sleeve 2 is moved in the same direction as the developer layer 5', thereby increasing the probability of contact between the developer and the developing sleeve 2 to accelerate the frictional charging.

The above-mentioned phenomenon can be verified from the change in developer density on the developing sleeve 2 as a function of number of turns thereof. FIG. 8 represents a chart showing the change in density of thin developer layer on the developing sleeve 2 up to saturation as a function of number of turns thereof, wherein the full line indicates a case of rotating the developing sleeve 2 and the magnetic brush sleeve 1 in the same direction thereby displacing the surface of said developing sleeve 2 oppositely to the developer layer 5', while the broken line indicates a case of rotating the developing sleeve and the magnetic brush sleeve 1 in opposite directions thereby causing the surface of said developing sleeve to move in the same direction as the magnetic brush in the mutually facing area. The density is measured by reflection from the applied thin developer layer, and is normalized to unity at saturation. While opposite rotations of said sleeves provided only unstable charging of the developer and required four turns of the developing sleeve to obtain the developer layer of the saturation density thereon as shown by the broken line, the rotations of said sleeves in the same direction easily provided enhanced charging to reach the saturation density after only one turn of the developing sleeve as shown by the full line.

In addition to the foregoing, the presence of retained pool 6' increases the contact area between the developing sleeve 2 and the developer, thereby extending the application time of the developer to further contribute to the increase in the density.

Secondly the arrangement shown in FIGS. 6 and 7 is practically extremely advantageous in that a local imperfection in the length of magnetic brush caused by foreign matter eventually trapped between the magnetic brush defining blade 4 and the magnetic brush sleeve 1 does not directly affect the developer layer 6 applied on the developing sleeve 2, since the retained pool 6' functions as a cushion for the developer before application onto the developing sleeve 2, thereby alleviating the difference between the defective portion and the normal portion of the developer layer 5'.

In the arrangement shown in FIGS. 6 and 7 the ratio of the clearance a between the magnetic brush defining blade 4 and the magnetic brush sleeve 1 clearance b between two sleeves 1 and 2 is important. FIG. 9 summarized the state of developer application onto the developing sleeve 2 as a function of said clearances a and b respectively selected as 0.5, 1.0, 1.5 or 2.0 mm, wherein the result is rated as satisfactory density substantially without ghost (⊙), satisfactory density associated however with slight ghost (O), slightly deficient density with marked ghost (Δ), deficient density with marked ghost (X), or irregular developer layer due to developer overflow (−).

As will be seen from FIG. 9, the developer layer 6 on the developing sleeve 2 acquires a higher density as said clearance a between the magnetic brush defining blade 4 and the magnetic brush sleeve 1 becomes closer to the clearance b between both sleeves 1, 2 within an extent it does not exceed said clearance b, but said developer layer becomes irregular as shown in FIG. 10 when said clearance a exceeds the clearance b. This phenomenon is due to the fact that the retained developer pool 6' grows larger as said clearance a between the magnetic brush defining blade 4 and the magnetic brush sleeve 1 becomes closer to the clearance b between said sleeves to elevate the density of the developer layer 6 through the expansion of the applying area as explained in the foregoing, but, when said clearance a exceeds the clearance b, the amount of the developer flowing into said pool 6' becomes in excess of the amount of developer flowing out from said pool 6' whereby said pool 6' is no longer capable of maintaining the equilibrium and repeats the steps of glowing and discharging the overflowing developer onto the developing sleeve 2.

In consideration of the foregoing and of the advantage of low load to the developer inherent to the jumping development, the condition for stable application with respect to the ratio of the clearance a between the magnetic brush defining blade 4 and the magnetic brush sleeve 1 to the clearance b between the sleeves 1, 2 can be represented as follows:

$$c < a \leq b$$

wherein c is the clearance between the developing sleeve 2 and the photosensitive drum 9.

In the above-mentioned relation particularly noteworthy in relation to the development ghost formed on the developing sleeve 2 is a case:

$$a = b$$

representing an application at the boundary condition between the stable application and overflowing application. As will be understood from FIG. 9, the thin developer layer acquires a higher density as the value a approaches to b, and the ghost is simultaneously reduced and almost vanishes at the condition a=b, owing to the presence of retained pool 6'. More specifically the thin layer 6 formed by the collision of the developer layer 5' with the developing sleeve 2 is immediately smoothed by the retained developer pool 6' and is further subjected therein to re-application of the developer, thus reducing the ghost image. Consequently the ghost is more effectively erased as the retained pool 6' grows larger, and the satisfactory condition for ghost elimination is represented by a=b.

FIG. 11 shows a variation of the device shown in FIG. 6, further comprising a magnetic pole 7 inside the developing sleeve. In this arrangement essential is a fact that the flux density on the magnetic brush sleeve 1 is larger than that on the developing sleeve 2 in the applying area, as otherwise the developer layer 5' itself is transferred in bulk onto the developing sleeve 2 thereby destructing the thin developer layer.

The presence of the magnetic pole 7 inside the developing sleeve 2 ensures a further stabilized application, firstly because the retained developer pool 6' is rendered stable against overflowing by the attractive force of the magnetic pole 7, particularly in case the ratio of the clearance between the magnetic brush defining blade 4 and the magnetic brush sleeve 1 to the clearance b between the sleeves 1, 2 is located at the boundary condition between a stable application and an overflowing application. Secondly the presence of the magnetic pole 7 enhances the collision of the developer layer 5' with the developing sleeve 2, thereby increasing the density of the developer layer 6 and thus alleviating the ghost phenomenon.

EXAMPLE 4

A developing device shown in FIG. 6 was prepared with the following parameters:

| | |
|---|---|
| peripheral speed of magnetic brush sleeve 1: | 200 mm/sec |
| peripheral speed of developing sleeve 2: | 350 mm/sec |
| both sleeves being rotated anticlockwise; | |
| clearance a (between magnetic brush defining blade 4 and magnetic brush sleeve): | 1.00 mm |
| clearance b (between sleeves): | 1.00 mm |
| flux density in the applying area: | |
| on the magnetic brush sleeve: | 800 gauss |
| on the developing sleeve: | 300 gauss | to stably obtain a thin layer in the order of 50μ of one-component magnetic developer of a high resistance (ca. $10^{16}$ Ωcm) on the developing sleeve 2. The ghost on the developing sleeve was not observable on the developed image.

In the developing devices shown in FIGS. 2 to 11, it is desirable to form a clearance between the developer layer 6 on the developing sleeve 2 and the photosensitive drum 9, and to apply an AC bias field across said clearance by means of a power source as shown in FIG. 1.

What we claim is:

1. A developing device for developing a latent image on a latent image bearing member, comprising:
   an image-developing bearing member for supporting one-component magnetic developer thereon;
   means for displacing said image-developing bearing member for transporting a layer of said developer to a developing position;
   a developer-feeding bearing member positioned in the proximity of said image-developing bearing member;
   magnetic-field generating means positioned opposite to said image-developing bearing member across said developer-feeding bearing member;
   a magnetic pole positioned on said magnetic-field generating means in facing relationship to said image-developing bearing member for forming a magnetic brush on said developer-feeding bearing member in such a manner that said magnetic brush comes into contact with said image-developing bearing member to form a thin developer layer thereon;
   a magnet positioned inside said image-developing bearing member in facing relationship to said magnetic pole for forming magnetic brush;
   wherein the magnetic transporting force of said image-developing bearing member is selected smaller than that of the developer-feeding bearing member in the mutually facing area between said bearing members.

2. A developing device according to the claim 1, wherein the perpendicular component of the magnetic flux density associated with the image-developing bearing member is, in the vicinity of the surface thereof in the mutually closest area of said bearing members, is not larger than the perpendicular component of the magnetic flux density associated with the developer-feeding bearing member.

3. A developing device according to the claim 1, wherein said image-developing bearing member is not provided therein with a magnetic pole in a position corresponding to the mutually facing area of said bearing members.

4. A developing device according to the claim 1, wherein a magnetic pole contributing to the formation of a thin developer layer is provided in the image-developing bearing member in a position upstream, with respect to the moving direction of the image-developing bearing member, of a position facing to the developer-feeding bearing member.

5. A developing device according to the claim 1, wherein the image-developing bearing member is not provided therein with a magnetic pole corresponding to a surface area thereof from a point thereof facing to the developer-feeding bearing member to a contact point, at the downstream side with respect to the moving direction of the image-developing bearing member, to a tangential line passing through the center of the developer-feeding bearing member.

6. A developing device for developing a latent image on a latent image bearing member, comprising:
   an image-developing bearing member for supporting one-component magnetic developer thereon;
   means for displacing said image-developing bearing member for transporting a layer of said developer to a developing position;
   a developer-feeding bearing member positioned in the proximity of said image-developing bearing member;
   magnetic-field generating means positioned opposite to said image-developing bearing member across said developer-feeding bearing member; and
   a magnetic pole positioned on said magnetic-field generating means in facing relationship to said image developing bearing member for forming a magnetic brush on said developer-feeding member in such a manner that said magnetic brush comes into contact with said image-developing bearing member to form a thin developer layer thereon;
   wherein the moving direction of said magnetic brush on the developer-feeding bearing member is opposite to that of the surface of the image-developing bearing member in the mutually facing area of said bearing members.

7. A developing device according to the claim 6, wherein said image-developing bearing member is provided therein with a magnetic member in a position facing to said magnetic pole for forming the magnetic brush.

8. A developing device according to the claim 6, wherein said image-developing bearing member is provided therein with a magnet in a position facing to said magnetic pole for forming the magnetic brush.

9. A developing device according to the claim 6, 7 or 8, wherein a clearance a between a magnetic brush defining blade and developer-feeding bearing member, a clearance b between said bearing members and a clearance c between the image-developing bearing member and the latent image bearing surface are so selected as to satisfy the following relation:

$$c < a \leq b.$$

10. A developing device according to the claim 9, wherein the clearance a between the magnetic brush defining blade and the developer-feeding bearing member is substantially equal to the clearance b between the bearing members.

11. A developing device according to the claim 6, 7 or 8, wherein the magnetic transporting force of the image-developing bearing member is so selected as to be smaller than that of the developer-feeding bearing member in the mutually facing area between said bearing members.

12. A developing device according to the claim 8, wherein the perpendicular component of the magnetic flux density associated with the image-developing bearing member is so selected, in the proximity of the surface of the image-developing bearing member at the mutually closest area of said bearing members, as to be not larger than the perpendicular component of the magnetic flux density associated with the developer-feeding bearing member.

13. A developing device according to the claim 6, wherein the image-developing bearing member is not provided therein with a magnetic pole in the mutually facing area of said bearing members.

14. A developing device according to the claim 8, wherein a magnetic pole contributing to the formation of a thin developer layer is positioned upstream, with respect to the moving direction of the image-developing bearing member, of a position facing to the developer-feeding bearing member and inside said image-developing bearing member.

15. A developing device according to the claim 8, wherein the image-developing bearing member is not provided therein with a magnetic pole corresponding to a surface area thereof from a point thereof facing to the developer-feeding bearing member to a contact point, at the downstream side with respect to the moving direction of the image-developing bearing member, to a tangential line passing through the center of the developer-feeding bearing member.

* * * * *

UNITED STATES PATENT AND TRADEMARK OFFICE
CERTIFICATE OF CORRECTION

PATENT NO. : 4,370,049

DATED : January 25, 1983

INVENTOR(S) : TSUKASA KUGE, ET AL.

It is certified that error appears in the above-identified patent and that said Letters Patent is hereby corrected as shown below:

On the Title Page, insert

--[30] Foreign Application Priority Data

March 11, 1980 [JP] Japan.....................55-30640
   March 11, 1980 [JP] Japan.....................55-30642 --

Signed and Sealed this

Twentieth Day of December 1983

[SEAL]

Attest:

GERALD J. MOSSINGHOFF

Attesting Officer

Commissioner of Patents and Trademarks